US008356790B2

(12) United States Patent
Wu et al.

(10) Patent No.: US 8,356,790 B2
(45) Date of Patent: Jan. 22, 2013

(54) STAND AND ELECTRONIC DEVICE USING THE SAME

(75) Inventors: Chao-Hsiung Wu, Taipei County (TW); Chien-Chung Wu, Taoyuan County (TW)

(73) Assignee: HannStar Display Corporation Ltd., Taipei (TW)

( * ) Notice: Subject to any disclaimer, the term of this patent is extended or adjusted under 35 U.S.C. 154(b) by 516 days.

(21) Appl. No.: 12/609,503

(22) Filed: Oct. 30, 2009

(65) Prior Publication Data

US 2011/0017898 A1    Jan. 27, 2011

(30) Foreign Application Priority Data

Jul. 24, 2009    (TW) .............................. 98125126 A

(51) Int. Cl.
*A47G 29/00*    (2006.01)
(52) U.S. Cl. ..................... 248/688; 248/677; 248/222.51
(58) Field of Classification Search .................. 248/688, 248/677, 676, 188, 188.8, 188.6, 469, 472, 248/474, 292.12, 291.1, 222.51, 222.52, 248/447, 454–458, 351; 40/741, 745, 747
See application file for complete search history.

(56) References Cited

U.S. PATENT DOCUMENTS

| | | | | |
|---|---|---|---|---|
| 6,003,260 | A * | 12/1999 | Chang | 40/748 |
| 6,547,308 | B2 * | 4/2003 | Hamelink et al. | 296/97.9 |
| 7,744,055 | B2 * | 6/2010 | Zeng et al. | 248/447 |
| 7,770,862 | B2 * | 8/2010 | Chen | 248/351 |
| 7,984,883 | B2 * | 7/2011 | Li et al. | 248/125.7 |
| 2002/0133995 | A1 * | 9/2002 | Cress et al. | 40/748 |

FOREIGN PATENT DOCUMENTS

| | | |
|---|---|---|
| CN | 201187667 | 1/2009 |
| TW | M336468 | 7/2008 |
| TW | M338601 | 8/2008 |
| TW | M352105 | 3/2009 |
| TW | M353402 | 3/2009 |

* cited by examiner

*Primary Examiner* — Gwendolyn Baxter
(74) *Attorney, Agent, or Firm* — Volpe and Koenig, P.C.

(57) ABSTRACT

A stand is provided. The stand is connected to a back cover of an object, and comprises a holding element; a positioning element disposed on the holding element; an elastic element having a hole and a first positioning portion, wherein the first positioning portion is engaged with a positioning slot of the back cover; and a fixing element fixing the elastic element to the holding element through the hole.

14 Claims, 11 Drawing Sheets

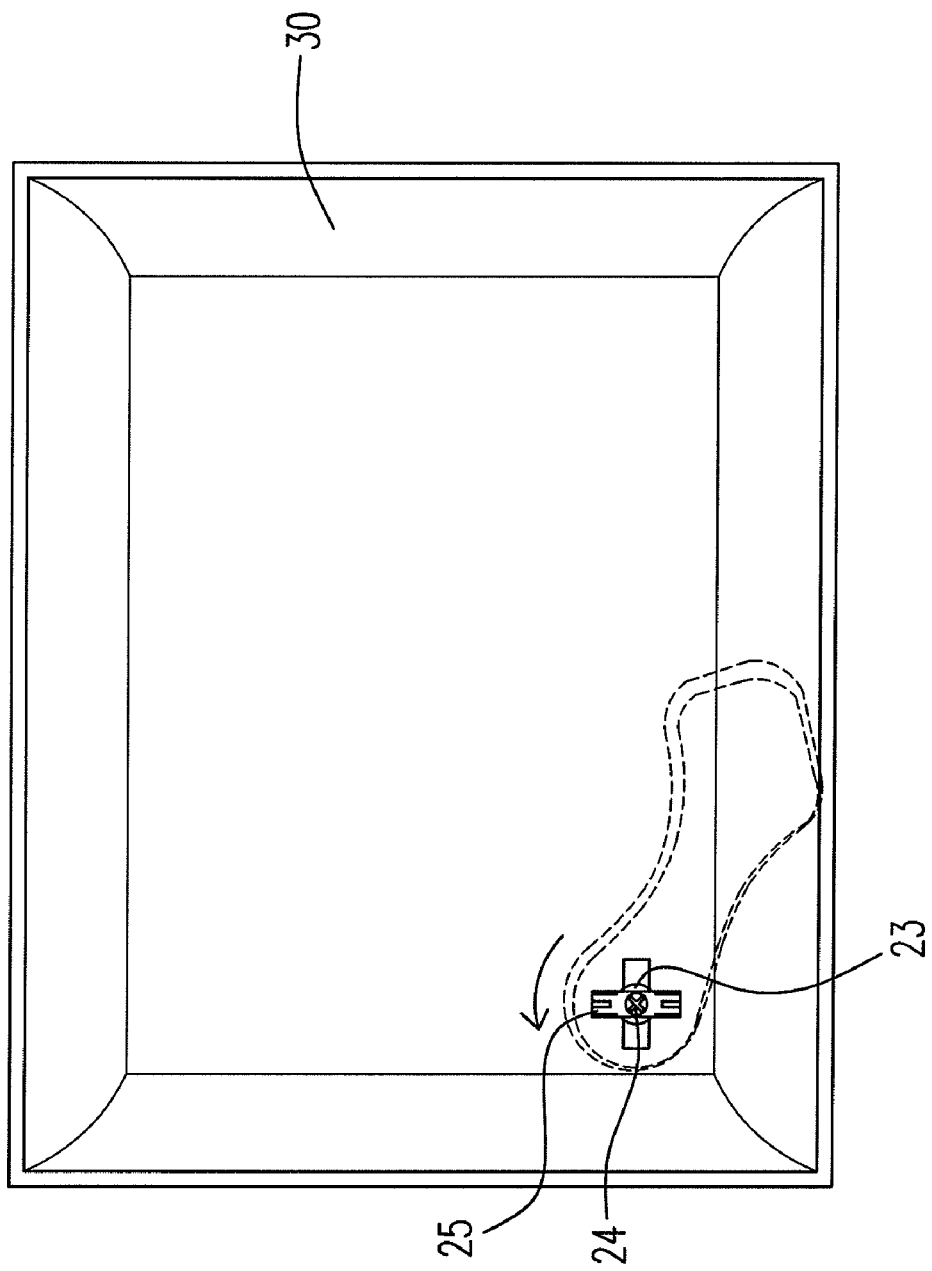

US 8,356,790 B2

STAND AND ELECTRONIC DEVICE USING THE SAME

FIELD OF THE INVENTION

The present invention relates to a stand, and more particularly to a stand applicable to an electronic device.

BACKGROUND OF THE INVENTION

The traditional picture frame is used for showing the picture. However, a traditional picture frame can only show one picture, which is very inconvenient. With the advance of science and technology, the digital picture frame has been invented to overcome the above-mentioned issue. The digital picture frame is not only light and thin but also can continuously display lots of digital pictures, so that it has gradually replaced the traditional picture frame and become popular in the market. The digital picture frame can save the space for disposing many of traditional picture frames as well as the capacity for collecting and preserving pictures. Besides, the digital pictures stored in the digital picture frame will not be faded as time goes by.

Please refer to FIG. 1, which shows the digital picture frame with a stand in the prior art. The stand 12 is engaged with the digital picture frame 10 through a screw 14. If the digital picture frame 10 is to be adjusted from vertical to horizontal, the screw 14 must be dismantled from the digital picture frame 10. Subsequently, the digital picture frame 10 is adjusted to a horizontal direction and then the stand 12 is engaged with the digital picture frame 10 through the screw 14, and vice versa. However in this way, the digital picture frame 10 might be toppled over easily due to the loosing of the screw 14.

In order to overcome the drawbacks in the prior art, a stand and the electronic device using the same are provided. The particular designs in the present invention not only solve the problems described above, but also are easy to be implemented. Thus, the present invention has the utility for the industry.

SUMMARY OF THE INVENTION

In accordance with an aspect of the present invention, a stand is provided to reduce the abrasion between the stand and the back cover of the object due to rotating motion.

In accordance with another aspect of the present invention, a stand is provided to prevent the object from toppling over due to the loosing of fixing elements.

In accordance with a further aspect of the present invention, a stand is provided. The stand is connected to a back cover of an object, and comprises a holding element; a positioning element disposed on the holding element; an elastic element having a hole and a first positioning portion, wherein the first positioning portion is engaged with a positioning slot of the back cover; and a fixing element fixing the elastic element to the holding element through the hole.

Preferably, the stand further comprises a spacer disposed between the back cover and the elastic element.

Preferably, the spacer comprises a second positioning portion engaged with the positioning slot of the back cover.

Preferably, the back cover further comprises a plurality of hot melt pillars fixing the spacer.

Preferably, the holding element is made of one of plastics and metal.

Preferably, the elastic element is made of one of plastics and metal.

Preferably, the elastic element has a bottom being arc-shaped.

Preferably, the first positioning portion is U-shaped.

Preferably, the elastic element further comprises a protruding portion.

Preferably, the positioning element further comprises a recess engaged with the protruding portion of the elastic element.

Preferably, the fixing element is made of one of plastics and metal.

Preferably, the positioning element is a pillar having a height substantially equal to a thickness of the back cover.

Preferably, the pillar is a cylinder.

Preferably, the positioning element and the holding element are formed in one piece.

In accordance with further another aspect of the present invention, a picture frame is provided. The picture frame comprises a body and a stand disposed at a side of the body, wherein the stand is connected to a back cover of an object and comprises a holding element; a positioning element disposed on the holding element; an elastic element having a hole and a first positioning portion, wherein the first positioning portion is engaged with a positioning slot of the back cover; and a fixing element fixing the elastic element to the holding element through the hole.

In accordance with further another aspect of the present invention, an electronic device is provided. The electronic device comprises a body and a stand disposed at a side of the body, wherein the stand is connected to a back cover of an object and comprises a holding element; a positioning element disposed on the holding element; an elastic element having a hole and a first positioning portion, wherein the first positioning portion is engaged with a positioning slot of the back cover; and a fixing element fixing the elastic element to the holding element through the hole.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 8a shows the digital picture frame with the stand through anticlockwise engagement;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
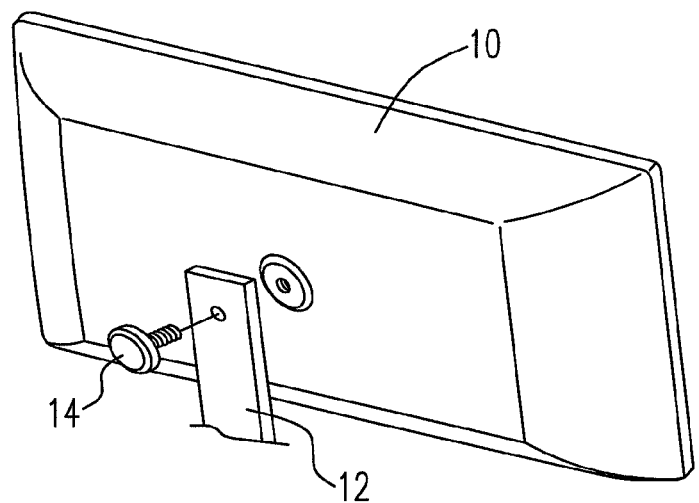
FIG. 1 shows the digital picture frame with a stand in the prior art.
Figure 2:
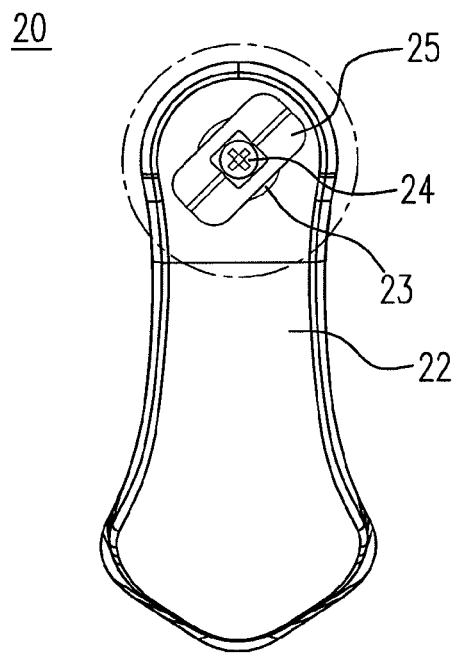
FIG. 2 is a front view of the stand in the present invention.
Figure 3:
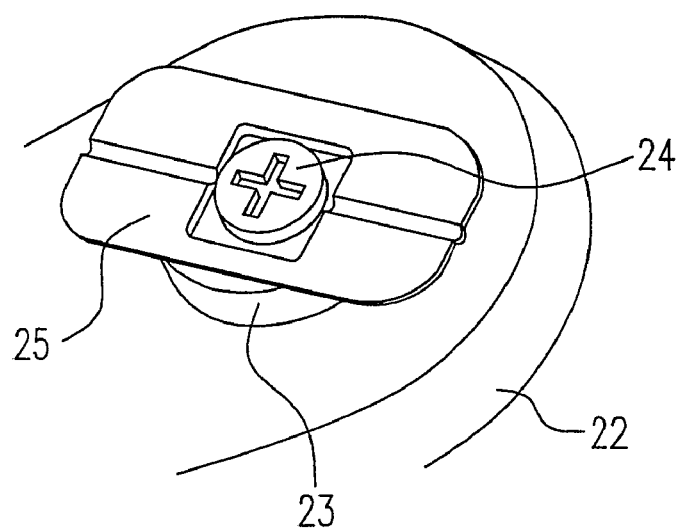
FIG. 3 is an enlarged view of the stand in the present invention.
Figure 4:
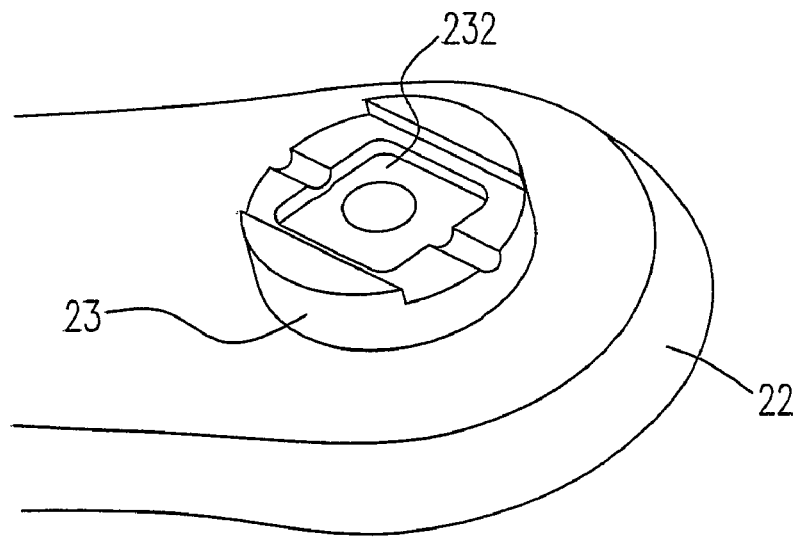
FIG. 4 is an enlarged view of the holding element in the present invention.
Figure 5A:
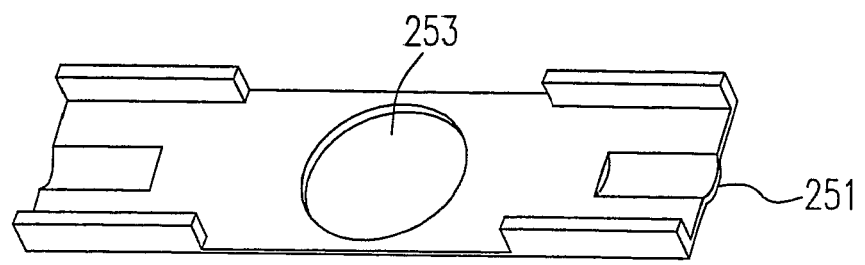
FIGS. 5a and 5b are enlarged views of the elastic element in the present invention.
Figure 5B:
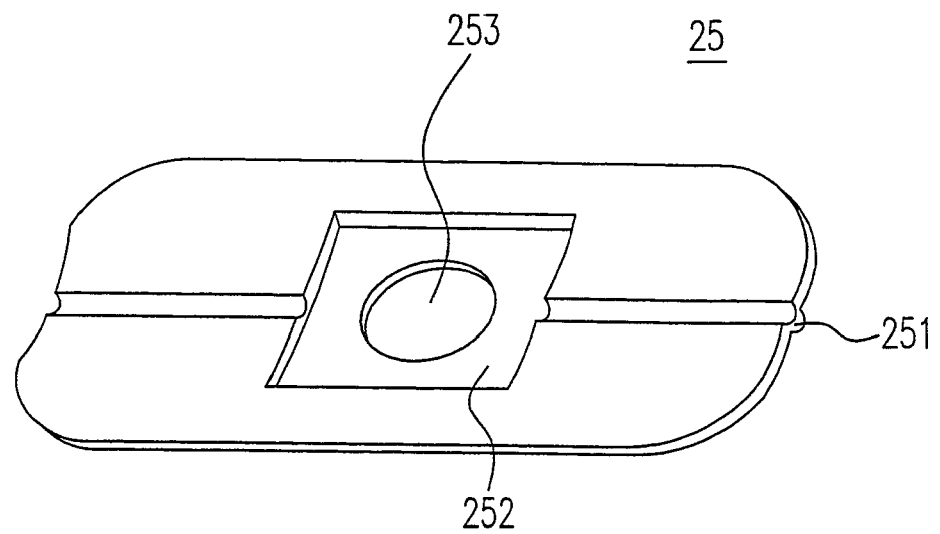
Figure 6:
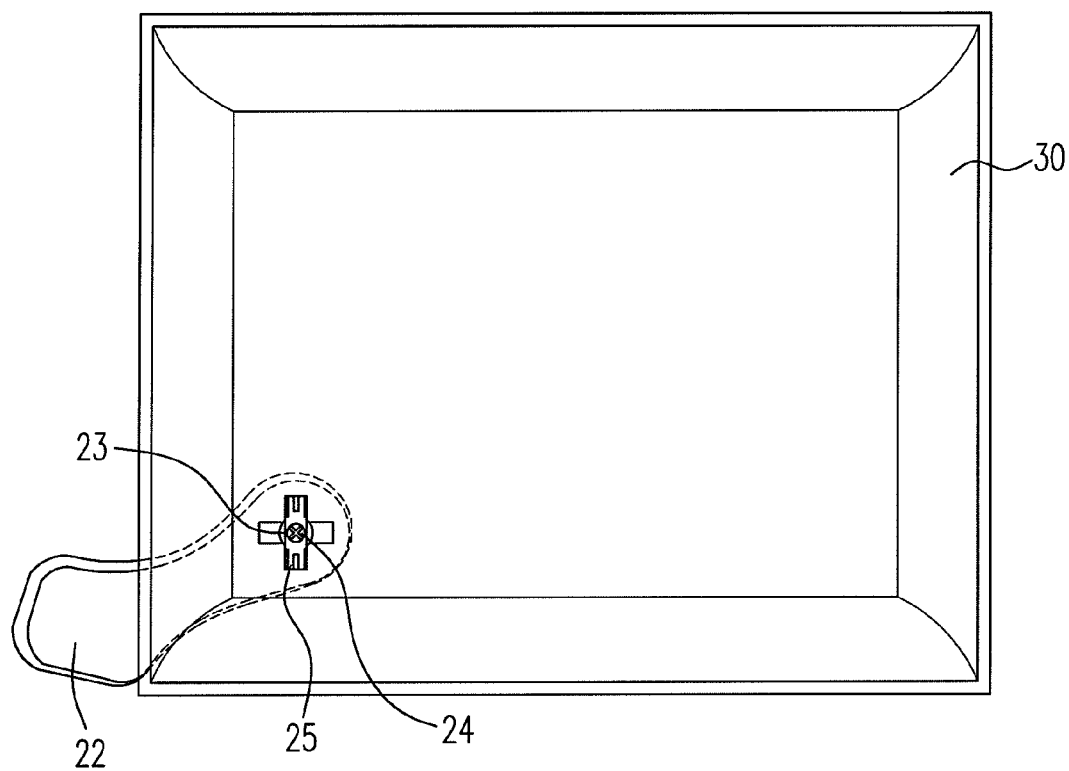
FIG. 6 shows the object with the stand before engagement.

Please refer to FIGS. 2-4, 5a, 5b and 6. FIG. 2 is a front view of the stand in the present invention. FIG. 3 is an enlarged view of the stand in the present invention. FIG. 4 is an enlarged view of the holding element in the present invention. FIGS. 5a and 5b are enlarged views of the elastic element in the present invention. FIG. 6 shows the object with the stand before engagement. The stand 20 includes a holding element 22, a positioning element 23, an elastic element 25 and a fixing element 24. The positioning element 23 is disposed on the holding element 22, and the holding element is engaged with a back cover 30 of an object through the fixing element 24. The holding element 22 is made of plastics or metal. The object can be a digital picture frame, a traditional picture frame or an electronic device, etc. In the preferred embodiment of the present invention, the object is exemplified by a digital picture frame.

Please refer to FIGS. 4, 5a, 5b, 7a, 8a and 9. The elastic element 25 includes a hole 253, and is fixed to the holding element 22 by the fixing element 24 passing through the hole 253. The elastic element 25 further includes a first positioning portion 251 being U-shaped, as shown in FIG. 5a. The first positioning portion 251 is engaged with a positioning slot 35 of the back cover 30. The elastic element 25 is made of plastics or metal, and has a bottom being arc-shaped, as shown in FIG. 5b. The fixing element 24 is made of plastics or metal, and is used for engaging the elastic element 25 with the stand 20. The positioning element 23 is a pillar, and the height of the pillar is substantially equal to the thickness of the back cover 30. The center of the pillar is the center that the stand 20 rotates around. In FIG. 4, the positioning element 23 is exemplified by a pillar; however, it is not limited thereto. Moreover, the positioning element 23 and the holding element 22 can be formed in one piece or separately.

Figure 9:
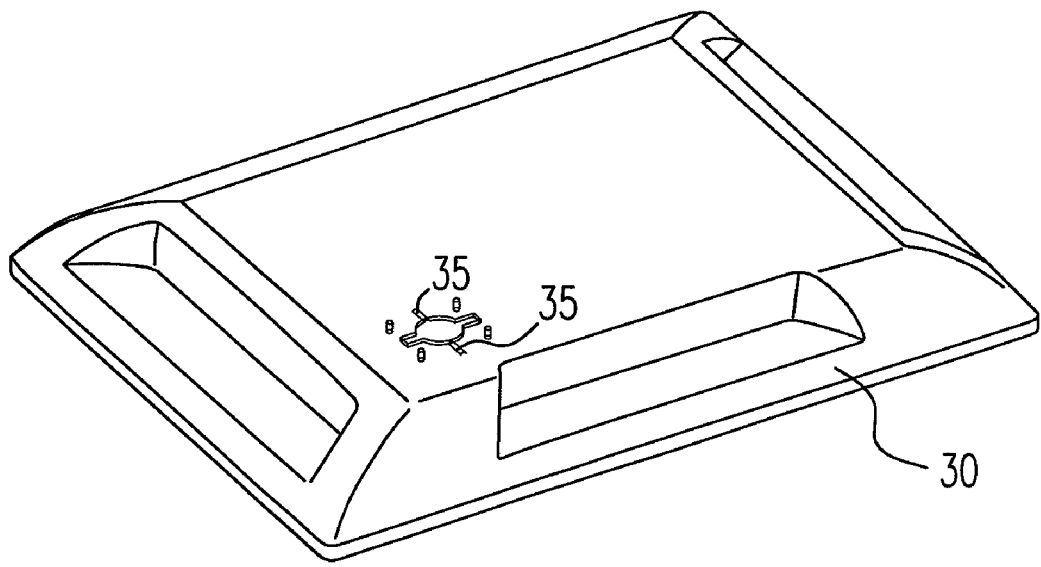
FIG. 9 shows the back cover in the present invention.
Figure 10:
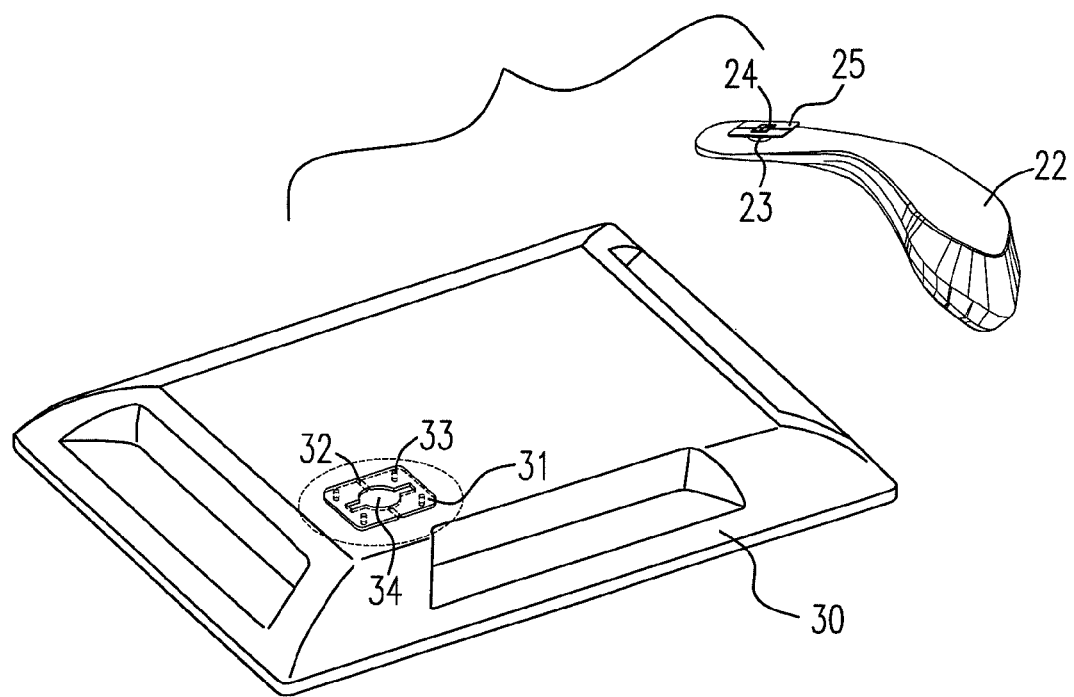
FIG. 10 shows the engagement of the back cover with the spacer in the present invention.

Please refer to FIGS. 9 and 10. FIG. 9 shows the back cover in the present invention, and FIG. 10 shows the engagement of the back cover with the spacer in the present invention. For avoiding the abrasion between the stand 20 and the back cover 30, the stand 20 further includes a spacer 31 disposed between the back cover 30 and the elastic element 25. The spacer 31 includes a second positioning portion 32 engaged with the positioning slot 35 of the back cover 30. The back cover 30 includes a plurality of hot melt pillars 33 for fixing the spacer 31. The hot melt pillars 33 and the back cover 30 are formed in one piece. Please refer to FIGS. 4 and 5b. The positioning element 23 further includes a recess 232, and the elastic element 25 further includes a protruding portion 252 which protrudes downward. The recess 232 is engaged with the protruding portion 252 to ensure the elastic element 25 firmly disposed on the positioning element 23.

Figure 7A:
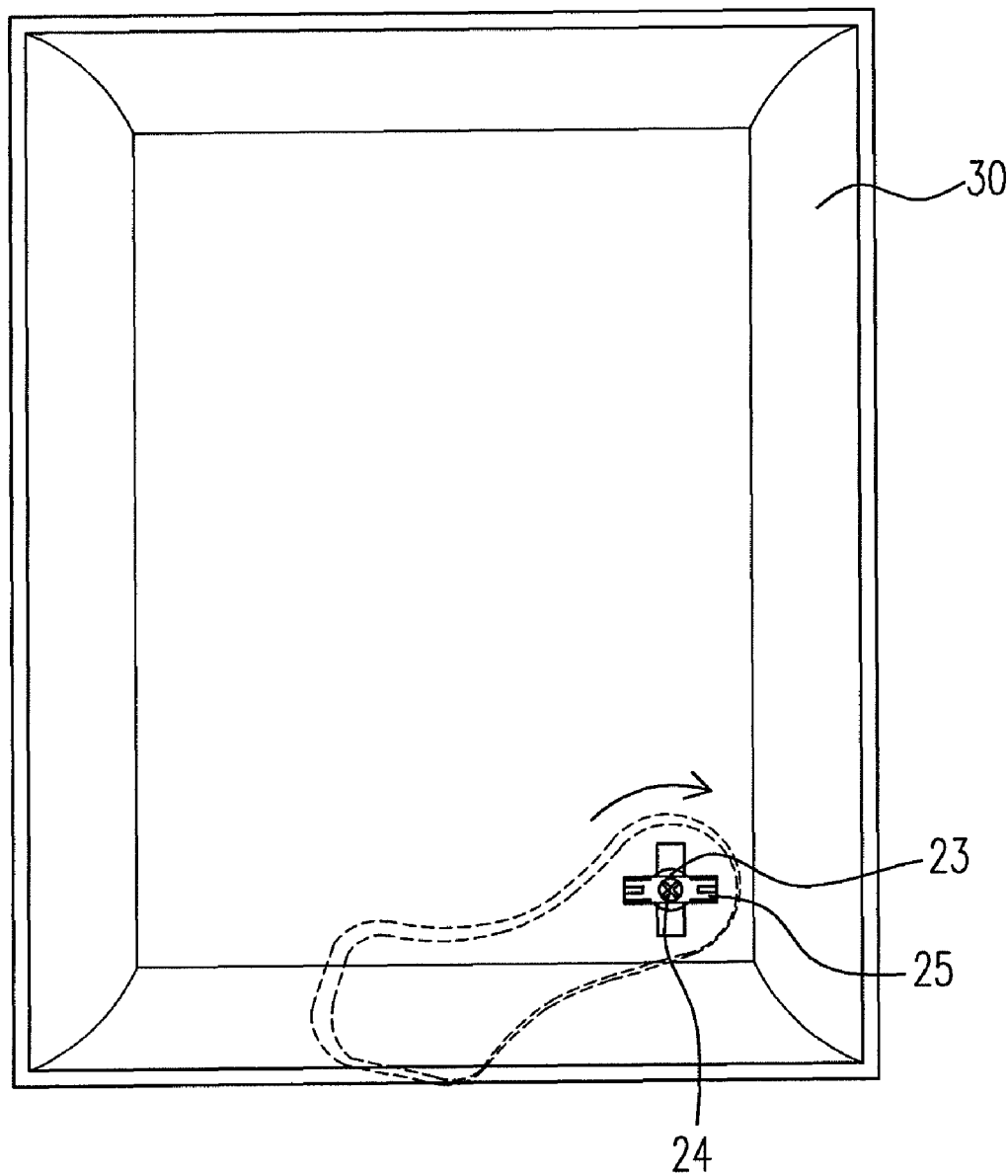
FIG. 7a shows the digital picture frame with the stand through clockwise engagement.
Figure 7B:
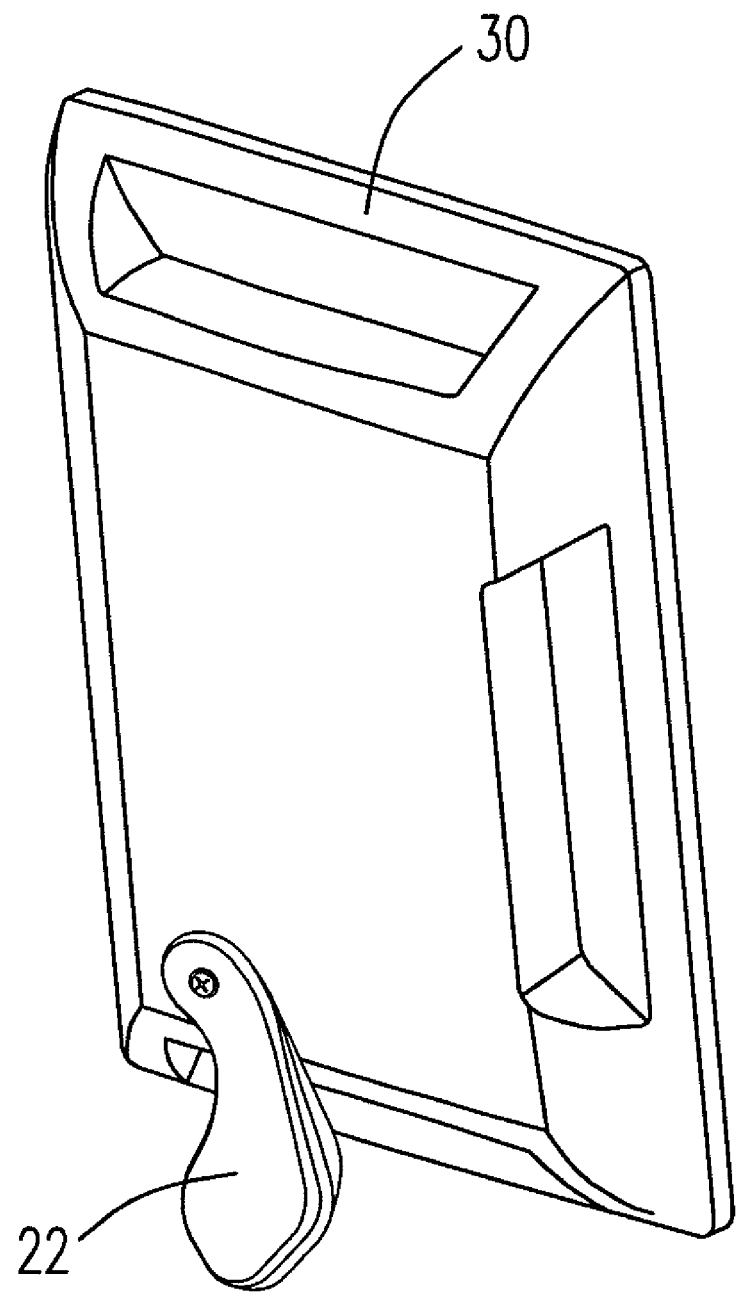
FIG. 7b shows the assembly of the digital picture frame and the stand in a vertical direction.
Figure 11:
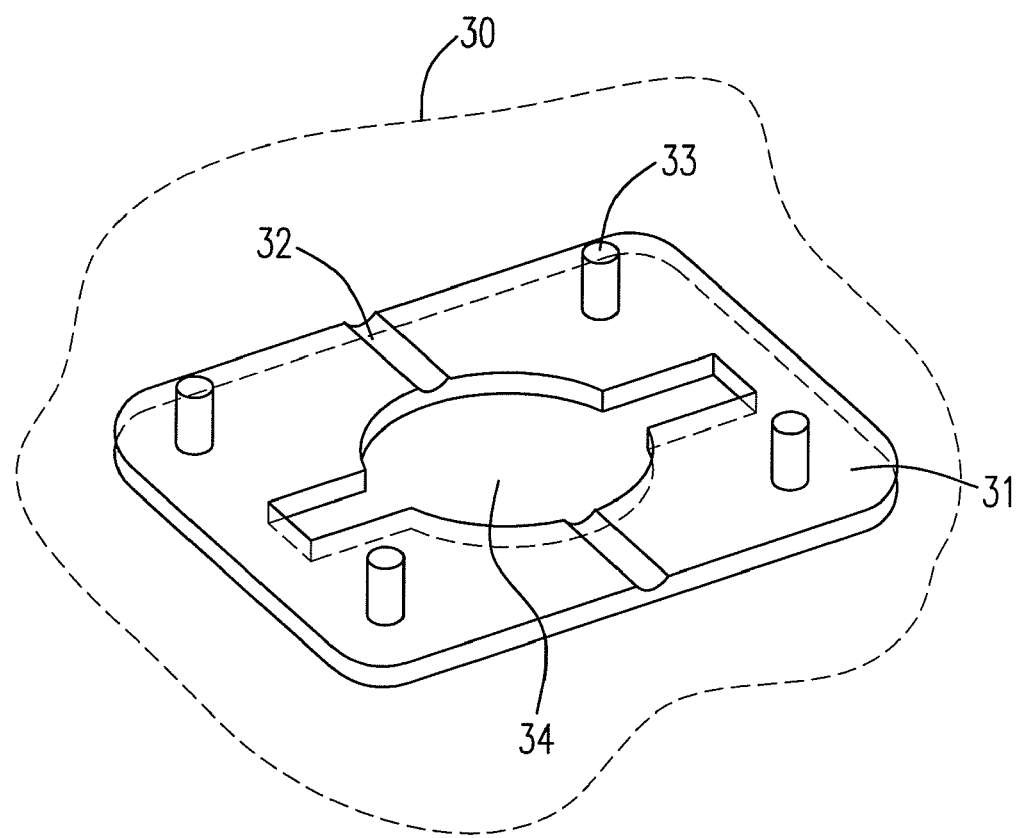
FIG. 11 is an enlarged view of the engagement of the back cover with the spacer in the present invention.

Please refer to FIGS. 6, 10 and 11. After the holding element 22, the positioning element 23, the elastic element 25 and the fixing element 24 are engaged with each other, the stand 20 is inserted into an opening 34 of the back cover 30 to enable the fixing element 24 to pass through the spacer 31. Then, the stand 20 is rotated clockwise until the first positioning portion 251 of the elastic element 25 is engaged with the second positioning portion 32 of the spacer 31. Hence, the assembly of the digital picture frame and the stand 20 in a vertical direction is completed, as shown in FIG. 7b.

Figure 8B:
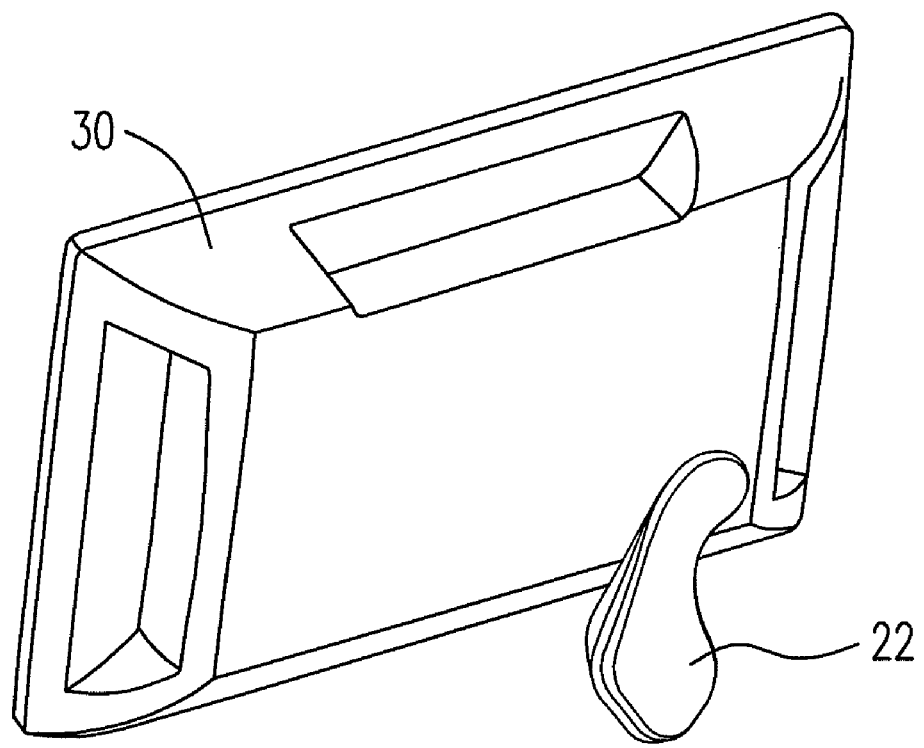
FIG. 8b shows the assembly of the digital picture frame and the stand in a horizontal direction.

Please refer to FIGS. 8a and 8b. FIG. 8a shows the digital picture frame with the stand through anticlockwise engagement, and FIG. 8b shows the assembly of the digital picture frame and the stand in a horizontal direction. After the holding element 22, the positioning element 23, the elastic element 25 and the fixing element 24 are engaged with each other, the stand 20 is inserted into an opening 34 of the back cover 30 to enable the fixing element 24 to pass through the spacer 31. Then, the stand 20 is rotated anticlockwise until the first positioning portion 251 of the elastic element 25 is engaged with the second positioning portion 32 of the spacer 31. Hence, the assembly of the digital picture frame and the stand 20 in a horizontal direction is completed, as shown in FIG. 8b.

Please refer to FIGS. 4, 5b, 10 and 11. The engagement of the recess 232 of the positioning element 23 with the protruding portion 252 of the elastic element 25 can enhance the durability of the elastic element 25, and limit the slide between the first positioning 251 of the elastic element 25 and the second positioning portion 32 of the spacer 31.

Besides, the elastic element 25 and the spacer 31 are made of plastics or metal which is wear-resisting and elastic, the back cover 30 further includes the hot melt pillars 33 for fixing the spacer 31, and the hot melt pillars 33 and the back cover 30 are formed in one piece. Accordingly, the slide between the spacer 31 and the back cover 30 will not occur. This reduces the abrasion of the digital picture frame due to the long and persistent rotating motion, and thus significantly increases the life of the digital picture frame.

In conclusion, the present invention uses the way of engaging to fix the stand to the digital picture frame. In this way, the amount of elements used is small, the structure is simple, and the stand is fixed to the digital picture frame more steadily. Accordingly, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A stand connected to a back cover of an object, comprising:
   a holding element;
   a positioning element disposed on the holding element;
   an elastic element having a hole and a first positioning portion, wherein the first positioning portion is engaged with a positioning slot of the back cover;
   a fixing element fixing the elastic element to the holding element through the hole; and
   a spacer disposed between the back cover and the elastic element, wherein the spacer includes a second positioning portion engaged with the positioning slot.

2. A stand as claimed in claim 1, wherein the holding element is made of one of plastics and metal.

3. A stand as claimed in claim 1, wherein the elastic element is made of one of plastics and metal.

4. A stand as claimed in claim 1, wherein the elastic element has a bottom being arc-shaped.

5. A stand as claimed in claim 1, wherein the first positioning portion is U-shaped.

6. A stand as claimed in claim 1, wherein the elastic element further comprises a protruding portion.

7. A stand as claimed in claim 6, wherein the positioning element further comprises a recess engaged with the protruding portion of the elastic element.

8. A stand as claimed in claim 1, wherein the fixing element is made of one of plastics and metal.

9. A stand as claimed in claim 1, wherein the positioning element is a pillar having a height substantially equal to a thickness of the back cover.

10. A stand as claimed in claim 9, wherein the pillar is a cylinder.

11. A stand as claimed in claim 1, wherein the positioning element and the holding element are formed in one piece.

12. A stand as claimed in claim 1, wherein the back cover includes a plurality of hot melt pillars fixing the spacer.

13. A picture frame comprising a body and a stand disposed at a side of the body, wherein the stand is connected to a back cover of an object and comprises:
   a holding element;
   a positioning element disposed on the holding element;
   an elastic element having a hole and a first positioning portion, wherein the first positioning portion is engaged with a positioning slot of the back cover;
   a fixing element fixing the elastic element to the holding element through the hole; and
   a spacer disposed between the back cover and the elastic element, wherein the spacer includes a second positioning portion engaged with the positioning slot.

14. An electronic device comprising a body and a stand disposed at a side of the body, wherein the stand is connected to a back cover of an object and comprises:
   a holding element;
   a positioning element disposed on the holding element;
   an elastic element having a hole and a first positioning portion, wherein the first positioning portion is engaged with a positioning slot of the back cover;
   a fixing element fixing the elastic element to the holding element through the hole; and
   a spacer disposed between the back cover and the elastic element, wherein the spacer includes a second positioning portion engaged with the positioning slot.

* * * * *